UNITED STATES PATENT OFFICE.

MICHAEL ILJINSKY, OF UERDINGEN-ON-THE-RHINE, GERMANY, ASSIGNOR TO THE FIRM OF R. WEDEKIND & CO. M. B. H., OF UERDINGEN-ON-THE-RHINE, GERMANY.

VAT DYESTUFFS AND PROCESS FOR THEIR FORMATION.

1,261,394. Specification of Letters Patent. Patented Apr. 2, 1918.

No Drawing. Application filed September 15, 1913. Serial No. 789,879.

*To all whom it may concern:*

Be it known that I, MICHAEL ILJINSKY, chemist, a subject of the Russian Emperor, residing at Uerdingen-on-the-Rhine, Germany, have invented new and useful Vat Dyestuffs and Process for Their Formation; and I do hereby declare the following to be a full, clear, and exact description of the same.

My invention relates to vat-dyestuffs containing sulfur with an anthraquinone molecule, which are obtained by dry heating of anthraquinone or anthraquinone derivatives with thiosulfates.

If for example anthraquinone-sulfonic acids or their salts are heated with thiosulfates, products which can easily be vatted and which take upon cotton in powerful fast tones are formed, while sulfur is liberated.

The products of the process protected by the German Patent 95484 are black sulfur dyestuffs and they are dyed from sodium sulfid solution. The products of the present invention are insoluble in sodium sulfid solution, they are dyed from alkaline hydrosulfite vats and they give olive-colored tints. Also the products resulting from the process described in German Patent 226879 (Example 3) are not identical with those of the present invention. Apart from the difference in color, the dyestuffs prepared according to that specification are all soluble in concentrated sulfuric acid, whereas the new products are insoluble in concentrated sulfuric acid.

For the preparation of sulfur dyestuffs, thiosulfates have heretofore many times been employed, but hitherto always in aqueous solutions and with addition of alkali. The present process on the contrary proceeds in the absence of water and alkali, the reacting mixture remaining dry during the whole process. Such thiosulfate melts (if "melts" may in this case be spoken of at all) have not previously been produced. It is surprising that under such circumstances the substances enter into reaction. Comparative experiments have demonstrated that for example a mixture of dry sodium anthraquinone-sulfonate, sulfate and sulfur, does not react in a similar manner under the same circumstances.

Example 1: 100 parts of sodium 2.6-anthraquinone-disulfonate and 400 parts of crystallized sodium thiosulfate are melted together and dried; the dried mass in finely-ground form is heated while being stirred in an iron vessel at from 250 to 300° C. until the sublimation of sulfur ceases. The powdery mixture, of light-gray color, gradually assumes a darker olive-green color without agglomeration. The product can either be vatted directly for dyeing or after it has been washed with alkaline water and brought into a paste. The alkaline hydrosulfite vat is deep red-brown, the leuco- compound takes upon cotton as a deep black. After hanging in the air, rinsing and soaping, an olive-color of surpassingly fast properties results. In the dry state the dyestuff appear as a dark powder which is soluble neither in concentrated sulfuric acid, nor in boiling nitrobenzene nor in boiling cresol.

Example 2: 100 parts of potassium 1-anthraquinone-mono-sulfonate are ground with 300 parts of calcium thiosulfite and heated in an iron vessel provided with a stirrer for some hours at 300 to 330° C., until the sublimation of sulfur ceases. The dry powder becomes more and more darkly colored. After cooling the product is extracted first with water, then successsively with dilute hydochloric acid and dilute soda lye, whereupon it can be used directly for dyeing. It is insoluble in concentrated sulfuric acid and in sodium sulfid. The alkaline vat with hydrosulfite is brown-violet-red. The dyeing upon cotton is olive-green.

The properties of the individual dyestuffs are apparent from the table below. The dyeings produced therewith possess in addition to a sufficient fastness to chlorin an extraordinary fastness to light, and they are extremely fast to washing and scalding; the latter property, as is well known, belongs to only few vat-dye-stuffs and it presents in many cases advantages in the weaving of the dyed goods with raw-white and subsequent steeping.

*Dyestuff from potassium 1 - anthraquinone-sulfonate.*

It is in concentrated sulfuric acid insoluble.

It is in sodium sulfid solution insoluble.
Vat: brown-violet-red (cold).
Dyeing: green-olive.

*Dyestuff from sodium 2.6-anthraquinone-disulfonate.*

It is in concentrated sulfuric acid insoluble.
It is in sodium sulfid solution insoluble.
Vat: red-brown (cold).
Dyeing: yellow-olive.

*Dyestuff from potassium 1.5-anthraquinone-disulfonate.*

It is in concentrated sulfuric acid insoluble.
It is in sodium sulfid solution insoluble.
Vat: violet (cold).
Dyeing: grey-olive.

*Dyestuff from potassium 1.8-anthraquinone-disulfonate.*

It is in concentrated sulfuric acid insoluble.
It is in sodium sulfid solution insoluble.
Vat: violet-red (cold).
Dyeing: green-olive.

*Dyestuff from anthraquinone-sulfonic salts of the German Patent 202398 (Example 3).*

It is in concentrated sulfuric acid insoluble.
It is in sodium sulfid solution insoluble.
Vat: brown-red (cold).
Dyeing: brown-olive.

*Dyestuff from potassium 1.5-anthraquinone-disulfonate, prepared according to the process of the German Patent 226879 (Example 3).*

It is in concentrated sulfuric acid soluble with brown coloration.
It is in sodium sulfid solution insoluble.
Vat: brown (only upon heating).
Dyeing: reddish black-brown.

In addition to their preparation from anthraquinone-sulfonic acid, the new vat-dyestuffs containing sulfur with an anthraquinone molecule can also be produced by heating dioxy-anthraquinone-sulfonic acids, viz., alizarin-sulfonic acid, anthraflavic-sulfonic acid, or isoanthraflavic-sulfonic acid with thiosulfates.

If a salt of alizarin-sulfonic acid is first heated with thiosulfate, the temperature being preferably raised to 330–350° C., analogous valuable vat-dyestuffs are formed, the shades of which extend to deep black. The raw product after washing with water and dilute alkali is suitable for dyeing direct as paste. The dyestuffs are very dark-colored bodies and are insoluble in organic solvents and in concentrated sulfuric acid, also in sodium sulfid. By this property they are sharply distinguished from the products obtained according to the process of the German Patent 95484, which products are dyed from sodium sulfid solution. They are on the contrary vatted from hydrosulfite in the presence of alkali and they then take well upon cotton.

Example 3: 100 parts of ordinary sodium alizarin-sulfonate are added to 500 parts of molten thiosulfate. The whole mass is dehydrated by heating and stirring. The dry powder is then heated in an iron vessel provided with a stirrer for about six hours at 330–335° C. The reaction effects the elimination of sulfur, which sublimes out from the dry black powder. After cooling the product is washed with water and dilute soda-lye; it then forms a paste with about 70 per cent. of moisture.

Example 4: 100 parts of sodium alizarin-sulfonate, produced according to the process of German Patent 210863 are treated as in Example 3.

Example 5: 100 parts of sodium alizarin-3-sulfonate are mixed with 300 parts of potassium thiosulfate, and then heated while being stirred for two hours at 300° C. and for four hours at 350°. The reaction proceeds as described in Example 3. The method for using the product is also the same.

Example 6: If instead of potassium thiosulfate calcium thiosulfate is treated as in Example 5, quite similar results are obtained. The raw product is in this case preferably extracted with water and thereafter with dilute hydrochloric acid before it is treated with lye.

The properties of the dyestuffs are apparent from the following table:—

*Dyestuff from ordinary alizarin-3-sulfonic acid.*

Vat: brown-reddish.
Dyeing: black.

*Dyestuff from alizarin-sulfonic acids of Germen Patent 210863.*

Vat: brown-reddish.
Dyeing: black.

The dyeings possess valuable properties of fastness. In addition to a sufficient fastness to chlorin, which surpasses considerably that of the products of German Patent 95484, they are notably fast to alkali, to steeping and to light.

Analogous vat-dyestuffs are formed by heating anthraflavic-sulfonic acids or isoanthraflavic-sulfonic acids or halogen derivatives of the said sulfonic acids with thiosulfates. The dyestuffs obtained in this way are likewise distinguished by a great fastness to soap, to fulling and to steeping, they are extraordinarily fast to light, and they considerably exceed in fastness to chlorin even the products prepared from alizarin-sulfonic acids. It is surprising that halogen-derivatives of anthraflavic and isoanthraflavic acids yield upon heating with thiosulfates black vat-dyestuffs, whereas halogen-derivatives of 2-oxyanthraquinone when heated with thiosulfates and subsequently chlorinated give only orange-red shades.

The method of operation is in all cases the same as that fully described for alizarin-sulfonic acids. As sulfo-derivatives there may be used the products sulfonated either direct with fuming sulfuric acid or by addition of boric acid or mercury. As a halogen-derivative the dichloranthraflavic acid obtainable according to the German Patent 152175 suggests itself on account of its cheapness. The dyestuffs produced from anthraflavic-sulfonic acids can readily be distinguished by their insolubility in concentrated sulfuric acid from the product obtainable from alizarin-sulfonic acids and which is soluble in alkali sulfids with green coloration. The dyestuffs produced from halogen derivatives are insoluble in concentrated sulfuric acid and in alkali sulfids. They are dyed in all cases from alkaline hydrosulfite vats.

For the formation of the new vat-dyestuffs containing sulfur with an anthraquinone molecule, it is however not necessary to start from the sulfonic acids of anthraquinone. Many analogous vat-dyestuffs may be obtained also by heating other anthraquinone derivatives, viz. 2-oxyanthraquinone or its halogen-derivatives with thiosulfates.

If 1-chlor-2-oxyanthraquinone or dibrom-2-oxyanthraquinone is first heated with sodium thiosulfate, alkali-insoluble products which dye cotton brown shades from alkaline vats are first formed. The dyeings are fairly fast to washing and soap. Upon chlorinating they gain considerably in purity while the shade changes to orange-red. The pure orange-red shade can also be produced directly by dissolving the alkali-insoluble raw-product in concentrated sulfuric acid, precipitating the purified dyestuff with water, and then treating the same with alkaline chlorin solution until it has attained the desired purity of shade and chlorin is still only slowly exhausted.

If 1-chlor-2-oxyanthraquinone or dibrom-2-oxyanthraquinone is subjected to the action of alkali sulfids in the presence of water, as for example in the process of German Patent 226879, alkali-soluble products are chiefly formed and the small alkali-insoluble residue is completely destroyed by chlorinating.

Also the process of French Patent 441772 leads in the case of 1-chlor-oxyanthraquinone or dibrom-2-oxyanthraquinone, to other products, which are fairly resistant to alkaline chlorination but which are absolutely not fast to acids and alkalis, as the dyeings produced therewith which are beautiful orange upon acidifying become blue-red upon the addition of alkali.

Example 7: 10 kilograms of 1-chlor-2-oxyanthraquinone are mixed with 100 kilograms of molten crystallized thiosulfate. The whole mass is then brought to dryness and powdered. The dry powder is heated to about 200° C. in an iron vessel with stirrer for about seven hours. At 150° C. the powder begins to darken but it remains powdery during the whole process. In this case however no sublimation of free sulfur takes place. After boiling the mass with hot water, the material not acted upon is extracted with diluted alkali. The alkali-insoluble product after being dried is dissolved in concentrated sulfuric acid precipitated with water, and in this finely-divided form it is treated with an alkaline chlorin solution until the desired purity of shade is attained. The product so purified appears, after drying, as a dark brown-red crystalline powder. Its solution in concentrated sulfuric acid is a beautiful green. Water precipitates orange-red flakes therefrom. The solution in hot nitrobenzene is brown. In the form of a paste the compound may easily be vatted in the cold with alkaline hydrosulfite. From a brown vat cotton is dyed in fast orange-red shades.

Example 8: By replacing 1-chlor-2-oxyanthraquinone by dibrom-2-oxyanthraquinone and otherwise following the method given in Example 7, quite similar results are arrived at. The purified and dried product appears as a dark brown-red crystalline powder. From its olive solution in concentrated sulfuric acid, water precipitates brick-red flakes. The solution in hot nitrobenzene is brown. From alkaline brown vats the dyestuff dyes cotton in a somewhat more bluish shade than the dyestuff in Example 7 does.

Analogous vat-dyestuffs are obtained if instead of the halogen-derivatives of 2-oxyanthraquinone, the latter itself or anthraquinone itself is taken. Anthraquinone or 2-oxyanthraquinone is heated with thiosulfates and otherwise treated as described in the foregoing examples for halogen-derivatives of 2-oxyanthraquinone; in this way quite fast shades are obtained which vary between orange and copper shades according to the time and the temperature of the reaction.

I claim:

1. Process for producing vat-dyestuffs containing an anthraquinone nucleus combined with sulfur, which process consists in heating anthraquinone-sulfonic acid with thio-sulfates in the absence of any solvent or diluent liquid.

2. A product containing an anthraquinone nucleus combined with sulfur, said product being obtained by heating anthraquinone sulfonic acid with thio-sulfates in the absence of any solvent or diluent liquid.

In testimony whereof, I have signed my name to this specification in the presence of two subscribing witnesses.

MICHAEL ILJINSKY.

Witnesses:
  JOSEF ROTHHUSH,
  AUGUST THEIPIN.